(12) United States Patent
Miller et al.

(10) Patent No.: US 11,775,552 B2
(45) Date of Patent: Oct. 3, 2023

(54) BINDING ANNOTATIONS TO DATA OBJECTS

(71) Applicant: Apptio, Inc., Bellevue, WA (US)

(72) Inventors: Michaeljon Miller, Bellevue, WA (US); Ioan Bogdan Crivat, Woodinville, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 15/859,008

(22) Filed: Dec. 29, 2017

(65) Prior Publication Data

US 2019/0205453 A1 Jul. 4, 2019

(51) Int. Cl.
| | | |
|---|---|---|
| *G06F 16/26* | (2019.01) | |
| *G06F 16/22* | (2019.01) | |
| *G06F 16/2457* | (2019.01) | |
| *G06F 16/245* | (2019.01) | |
| *G06F 16/28* | (2019.01) | |

(52) U.S. Cl.
CPC .......... *G06F 16/26* (2019.01); *G06F 16/2282* (2019.01); *G06F 16/245* (2019.01); *G06F 16/24573* (2019.01); *G06F 16/287* (2019.01)

(58) Field of Classification Search
CPC ......... G06F 17/30525; G06F 16/24573; G06F 16/26; G06F 16/2282
See application file for complete search history.

(56) References Cited

U.S. PATENT DOCUMENTS

| | | | |
|---|---|---|---|
| 4,744,026 A | 5/1988 | Vanderbei | |
| 5,249,120 A | 9/1993 | Foley | |
| 5,615,121 A | 3/1997 | Babayev et al. | |
| 5,721,919 A | 2/1998 | More et al. | |
| 5,758,327 A | 5/1998 | Gardner et al. | |
| 5,799,286 A | 8/1998 | Morgan et al. | |
| 5,802,508 A | 9/1998 | Morgenstern | |
| 5,903,453 A | 5/1999 | Stoddard, II | |
| 5,970,476 A | 10/1999 | Fahey | |
| 5,991,741 A | 11/1999 | Speakman et al. | |
| 6,014,640 A | 1/2000 | Bent | |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |

(Continued)

FOREIGN PATENT DOCUMENTS

JP 2011134268 A 7/2011

OTHER PUBLICATIONS

US 5,649,211 A, 04/1997, Horkin et al. (withdrawn)

(Continued)

*Primary Examiner* — Marc S Somers

(74) *Attorney, Agent, or Firm* — John W. Branch; Branch Partners PLLC

(57) ABSTRACT

Various embodiments are directed to managing annotations over a network for visualizations. An annotation engine enables users to associate a data object value with any number of notes, comments, videos, graphics, pictures, audio, references, links, or any other information A visualization engine generates visualizations that include annotation identifiers when the visualizations include data object values that are associated with annotations and the type of visualization is approved for use with the annotations.

30 Claims, 9 Drawing Sheets

(56) References Cited

U.S. PATENT DOCUMENTS

| | | |
|---|---|---|
| 6,253,192 B1 | 6/2001 | Corlett et al. |
| 6,308,166 B1 | 10/2001 | Breuker et al. |
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 8/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,769,654 B1 | 8/2010 | Hurewitz |
| 7,774,458 B2 | 8/2010 | Trinon et al. |
| 7,783,759 B2 | 8/2010 | Eilam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,175,863 B1 | 5/2012 | Ostermeyer et al. |
| 8,195,524 B2 | 6/2012 | Sandholm et al. |
| 8,200,518 B2 | 6/2012 | Bailey et al. |
| 8,200,561 B1 | 6/2012 | Scott et al. |
| 8,209,218 B1 | 6/2012 | Basu et al. |
| 8,260,959 B2 | 9/2012 | Rudkin et al. |
| 8,370,243 B1 | 2/2013 | Cernyar |
| 8,396,775 B1 | 3/2013 | Mindlin |
| 8,423,428 B2 | 4/2013 | Grendei et al. |
| 8,484,355 B1 | 7/2013 | Lochhead et al. |
| 8,533,904 B2 | 9/2013 | Conrad |
| 8,543,438 B1 | 9/2013 | Fleiss |
| 8,600,830 B2 | 12/2013 | Hoffberg |
| 8,601,263 B1 | 12/2013 | Shankar et al. |
| 8,655,714 B2 | 2/2014 | Weir et al. |
| 8,667,385 B1 * | 3/2014 | Mui ............... G06F 17/241 |
| | | 715/205 |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 | 12/2015 | French et al. |
| 9,268,964 B1 * | 2/2016 | Schepis ............... G06F 21/6227 |
| 9,281,012 B2 | 3/2016 | Hedges |
| 9,384,511 B1 | 7/2016 | Purpus |
| 9,529,863 B1 * | 12/2016 | Gindin ............... G06Q 40/00 |
| 9,805,311 B1 | 10/2017 | Mohler |
| 10,152,722 B2 | 12/2018 | Heath |
| 2002/0002557 A1 | 1/2002 | Straube et al. |
| 2002/0016752 A1 | 2/2002 | Sun |
| 2002/0056004 A1 | 5/2002 | Smith |
| 2002/0069102 A1 | 6/2002 | Vellante et al. |
| 2002/0082966 A1 | 6/2002 | O'Brien et al. |
| 2002/0087441 A1 | 7/2002 | Wagner, Jr. et al. |
| 2002/0107914 A1 | 8/2002 | Charisius et al. |
| 2002/0123945 A1 | 9/2002 | Booth et al. |
| 2002/0129342 A1 | 9/2002 | Kil et al. |
| 2002/0145040 A1 | 10/2002 | Grabski |
| 2002/0154173 A1 | 10/2002 | Etgen et al. |
| 2002/0156710 A1 | 10/2002 | Ryder |
| 2002/0174006 A1 | 11/2002 | Rugge et al. |
| 2002/0178198 A1 | 11/2002 | Steele |
| 2002/0194329 A1 | 12/2002 | Alling |
| 2003/0019350 A1 | 1/2003 | Khosla |
| 2003/0074269 A1 | 4/2003 | Viswanath |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0103013 A1 | 5/2004 | Jameson |
| 2004/0111509 A1 | 6/2004 | Eilam et al. |
| 2004/0133876 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0037326 A1 * | 2/2005 | Kuntz ............... G09B 7/00 |
| | | 434/353 |
| 2005/0038788 A1 * | 2/2005 | Dettinger ............. G06F 21/6227 |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |

(56) References Cited

U.S. PATENT DOCUMENTS

| | | |
|---|---|---|
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Harthcryde et al. |
| 2007/0198390 A1 | 8/2007 | Lazear et al. |
| 2007/0198982 A1 | 8/2007 | Bolan et al. |
| 2007/0214413 A1 | 9/2007 | Boeckenhauer |
| 2007/0226090 A1 | 9/2007 | Stratton |
| 2007/0260532 A1 | 11/2007 | Blake, III |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0221949 A1 | 9/2008 | Delurgio et al. |
| 2008/0222638 A1 | 9/2008 | Beaty et al. |
| 2008/0239393 A1 | 10/2008 | Navor |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0018996 A1 | 1/2009 | Hunt et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0307597 A1 | 12/2009 | Bakman |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0137917 A1* | 6/2011 | Boland ............ G06F 16/24573 707/E17.014 |
| 2011/0167034 A1 | 7/2011 | Knight et al. |
| 2011/0196795 A1 | 8/2011 | Pointer |
| 2011/0238608 A1 | 8/2011 | Sathish |
| 2011/0225277 A1 | 9/2011 | Freimuth et al. |
| 2011/0261049 A1 | 10/2011 | Cardno et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0014057 A1 | 1/2013 | Reinpoldt et al. |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1* | 4/2013 | Kikin-Gil ............ G06F 3/0485 715/817 |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0159926 A1* | 6/2013 | Vainer ............... G06F 16/24575 715/804 |
| 2013/0173159 A1 | 7/2013 | Trum et al. |
| 2013/0179371 A1 | 7/2013 | Jain et al. |

(56) References Cited

U.S. PATENT DOCUMENTS

| | | | |
|---|---|---|---|
| 2013/0201193 A1* | 8/2013 | McLachlan | G06Q 10/06313 345/441 |
| 2013/0227584 A1 | 8/2013 | Greene et al. | |
| 2013/0268307 A1 | 10/2013 | Li et al. | |
| 2013/0282537 A1 | 10/2013 | Snider | |
| 2013/0293551 A1 | 11/2013 | Erez et al. | |
| 2013/0339274 A1 | 12/2013 | Willis et al. | |
| 2013/0346390 A1 | 12/2013 | Jerzak et al. | |
| 2014/0006085 A1 | 1/2014 | McLachlan et al. | |
| 2014/0006222 A1 | 1/2014 | Hericks et al. | |
| 2014/0067632 A1 | 3/2014 | Curtis | |
| 2014/0075004 A1 | 3/2014 | Van Dusen et al. | |
| 2014/0089509 A1 | 3/2014 | Akolkar et al. | |
| 2014/0108295 A1 | 4/2014 | Renshaw | |
| 2014/0122374 A1 | 5/2014 | Hacigumus et al. | |
| 2014/0129583 A1 | 5/2014 | Munkes et al. | |
| 2014/0136295 A1 | 5/2014 | Wasser | |
| 2014/0143175 A1 | 5/2014 | Greenshields et al. | |
| 2014/0172918 A1 | 6/2014 | Kornmann et al. | |
| 2014/0229212 A1 | 8/2014 | MacElheron et al. | |
| 2014/0244364 A1 | 8/2014 | Evers | |
| 2014/0252095 A1 | 9/2014 | Kikin | |
| 2014/0257928 A1 | 9/2014 | Chen et al. | |
| 2014/0278459 A1 | 9/2014 | Morris | |
| 2014/0279121 A1 | 9/2014 | George et al. | |
| 2014/0279201 A1 | 9/2014 | Iyoob et al. | |
| 2014/0279676 A1 | 9/2014 | Schafer et al. | |
| 2014/0288987 A1 | 9/2014 | Liu | |
| 2014/0337007 A1 | 11/2014 | Waibel et al. | |
| 2014/0351166 A1 | 11/2014 | Schlossberg | |
| 2014/0365503 A1 | 12/2014 | Franceschini et al. | |
| 2014/0365504 A1 | 12/2014 | Franceschini et al. | |
| 2015/0006552 A1 | 1/2015 | Lord | |
| 2015/0012328 A1 | 1/2015 | McLachlan et al. | |
| 2015/0046363 A1 | 2/2015 | McNamara et al. | |
| 2015/0066808 A1 | 3/2015 | Legare et al. | |
| 2015/0074075 A1 | 3/2015 | Alexander | |
| 2015/0088584 A1 | 3/2015 | Santiago, III et al. | |
| 2015/0120370 A1 | 4/2015 | Agrawal et al. | |
| 2015/0120373 A1 | 4/2015 | Bajaj et al. | |
| 2015/0149257 A1 | 5/2015 | Bielat et al. | |
| 2015/0234944 A1 | 8/2015 | Marceau et al. | |
| 2015/0278024 A1 | 10/2015 | Barman et al. | |
| 2015/0294273 A1 | 10/2015 | Barraci et al. | |
| 2015/0302303 A1 | 10/2015 | Hakim | |
| 2015/0341230 A1 | 11/2015 | Dave et al. | |
| 2016/0098234 A1 | 4/2016 | Weaver et al. | |
| 2016/0266594 A1 | 9/2016 | Kauffman et al. | |
| 2017/0091689 A1 | 3/2017 | Elliott | |
| 2017/0102246 A1 | 4/2017 | Yang | |
| 2017/0154088 A1 | 6/2017 | Sherman | |
| 2018/0068246 A1 | 3/2018 | Crivat et al. | |
| 2018/0096039 A1* | 4/2018 | Otaguro | G06F 16/26 |

OTHER PUBLICATIONS

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express# Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XSX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 dated Jul. 14, 2010, 12 pages.

International Preliminary Report on Patentability for International Patent Application No. PCT/US2010/035021 dated Nov. 24, 2011, 10 pages.

International Search Report and Written Opinion for International Patent Application No. PCT/US2012/028353 dated Oct. 31, 2012, 9 pages.

International Preliminary Report on Patentability for International Patent Application No. PCT/US2012/028353 dated Sep. 19, 2013, 6 pages.

International Search Report and Written Opinion for International Patent Application No. PCT/US2012/028378 dated Sep. 12, 2012, 11 pages.

International Preliminary Report on Patentability for International Patent Application No. PCT/US2012/028378 dated Sep. 19, 2013, 7 pages.

Extended European Search Report in EP Application No. 13151967.0-1955, dated Apr. 19, 2013, 8 pages.

Official Communication for U.S. Appl. No. 12/467,120 dated Oct. 4, 2011, 12 pages.

Official Communication for U.S. Appl. No. 12/467,120 dated Jun. 20, 2012, 17 pages.

Official Communication for U.S. Appl. No. 12/467,120 dated Aug. 29, 2012, 3 pages.

Official Communication for U.S. Appl. No. 12/467,120 dated Oct. 23, 2013, 21 pages.

Official Communication for U.S. Appl. No. 12/467,120 dated Mar. 26, 2013, 18 pages.

Official Communication for U.S. Appl. No. 13/324,253 dated Sep. 25, 2012, 17 pages.

(56) References Cited

OTHER PUBLICATIONS

Official Communication for U.S. Appl. No. 13/324,253 dated Jan. 10, 2013, 20 pages.
Official Communication for U.S. Appl. No. 13/324,253 dated Mar. 19, 2013, 3 pages.
Official Communication for U.S. Appl. No. 13/324,253 dated Sep. 6, 2013, 21 pages.
Official Communication for U.S. Appl. No. 13/415,797 dated Oct. 3, 2013, 17 pages.
Official Communication for U.S. Appl. No. 13/452,628 dated Apr. 22, 2013, 11 pages.
Official Communication for U.S. Appl. No. 13/675,837 dated Oct. 10, 2013, 41 pages.
Official Communication for U.S. Appl. No. 13/837,815 dated Oct. 23, 2013, 9 pages.
Official Communication for U.S. Appl. No. 13/917,478 dated Nov. 7, 2013, 15 pages.
Official Communication for U.S. Appl. No. 13/917,503 dated Oct. 10, 2013, 41 pages.
Official Communication for U.S. Appl. No. 13/935,147 dated Oct. 22, 2013, 16 pages.
Office Communication for U.S. Appl. No. 13/649,019 dated Sep. 23, 2015, 15 pages.
Office Communication for U.S. Appl. No. 13/365,150 dated Sep. 24, 2015, 15 pages.
Office Communication for U.S. Appl. No. 14/033,130 dated Sep. 15, 2015, 22 pages.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for Application No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Official Communication for U.S. Appl. No. 13/452,628 dated Nov. 18, 2013, 15 pages.
Official Communication for U.S. Appl. No. 14/033,130 dated Dec. 16, 2013, 15 pages.
Official Communication for U.S. Appl. No. 13/675,837 dated Jan. 31, 2014, 37 pages.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,308 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
European Search Report for Application No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No. 13/415,797 dated Oct. 19, 2015, 3 pages.
Official Communication for U.S. Appl. No. 13/837,815 dated Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Van Diessen et al., "Component Business Model for Digital Repositories: A Framework for Analysis," AAAI, 2008, 7 pages.

(56) References Cited

OTHER PUBLICATIONS

Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Official Communication for U.S. Appl. No. 14/867,552 dated Oct. 3, 2016, 19 pages.
Office Communication for U.S. Appl. No. 13/837,815 dated Jun. 23, 2016, 3 pages.
Office Communication for U.S. Appl. No. 14/033,130 dated Apr. 25, 2016, 4 pages.
Office Communication for U.S. Appl. No. 14/846,349 dated Jul. 1, 2016, 24 pages.
Office Communication for U.S. Appl. No. 14/869,721 dated Jun. 1, 2016, 35 pages.
Office Communication for U.S. Appl. No. 14/971,944 dated May 19, 2016, 17 pages.
Office Communication for U.S. Appl. No. 14/977,368 dated Jun. 7, 2016, 11 pages.
Office Communication for U.S. Appl. No. 14/981,747 dated Jul. 14, 2016, 29 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/180,308 dated May 25, 2017, 21 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/365,150 dated Aug. 23, 2017, 30 pages.
Official Communication for U.S. Appl. No. 15/260,221 dated Aug. 15, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/935,147 dated Nov. 3, 2017, 11 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 15/351,313 dated Jul. 18, 2017, 15 pages.

(56) References Cited

OTHER PUBLICATIONS

Official Communication for U.S. Appl. No. 15/351,313 dated Jan. 12, 2017, 7 pages.
Official Communication for U.S. Appl. No. 13/837,815 dated Jan. 26, 2018, 12 pages.
Official Communication for U.S. Appl. No. 13/935,147 dated Jan. 17, 2018, 3 pages.
Official Communication for U.S. Appl. No. 14/869,721 dated Jan. 19, 2018, 3 pages.
Official Communication for U.S. Appl. No. 14/867,552 dated Feb. 13, 2018, 3 pages.
Official Communication for U.S. Appl. No. 14/846,349 dated Jan. 18, 2018, 29 pages.
Official Communication for U.S. Appl. No. 13/324,253 dated Jan. 23, 2014, pp. 1-25.
Official Communication for U.S. Appl. No. 13/649,019 dated Feb. 10, 2015, pp. 1-14.
Official Communication for U.S. Appl. No. 13/837,815 dated Apr. 13, 2016, pp. 1-41.
Official Communication for U.S. Appl. No. 13/917,593 dated Jan. 31, 2014, pp. 1-36.
Official Communication for U.S. Appl. No. 14/722,563 dated Mar. 31, 2016, pp. 1-7.
Amazon Reserved Instances Amazon Web Services archives org, Jan. 14, 2013, pp. 1-4, http://webarchive.org/web/2012011453849/http://aws.amazon.com/rds/reserved-instances/?.
Cost Optimisation with Amazon Web Services, extracted slides, Slideshare Jan. 30, 2012, pp. 1-27. http://www.slideshare.net/AmazonWebServices/cost-optimisation-with-amazon-web-services?from_search=1.
Deciding an Approach to the cloud AWS Reserved Instances, Cloudyn webpages, Jan. 19, 2014, pp. 1-2. https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011, pp. 1-30. http://www.slideshare.net/harishganesan/auto-scaling-using-amazon-web-services-aws.
Robinson Glen, Cloud Economics—Cost Optimization (selected slides), Amazon Web Services AWS, Slideshare, Feb. 28, 2012, pp. 1-30. http://www.slideshare.net/AmazonWebServices/whats-new-with-aws-london.
Skilton et al, Building Return on Investment from Cloud Computing, The open Group Whitepaper, mladina webpages, Apr. 2010, pp. 1-30. http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 18, 2012. pp. 1-12. http://www.slideshare.net/AmazonWebServices/optimizing-your-infrastructure-costs-on-aws.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 13/935,147 dated Apr. 5, 2018, pp. 1-14.
Official Communication for U.S. Appl. No. 14/869,721 dated May 11, 2018, pp. 1-33.
Official Communication for U.S. Appl. No. 14/867,552 dated May 31, 2018, pp. 1-22.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 15/858,945 dated Sep. 10, 2018, pp. 1-25.
Official Communication for U.S. Appl. No. 13/917,503 dated Nov. 20, 2018, pp. 1-55.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 14/981,747 dated Aug. 1, 2019, pp. 1-5.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Selen, et al. "Model-Order Selection: a review of information criterion rules," IEEE Signal Processing Magazine, Jul. 2004, pp. 38-47.
Official Communication for U.S. Appl. No. 13/917,503 dated Apr. 1, 2019, pp. 1-34.
Official Communication for U.S. Appl. No. 13/935,147 dated Mar. 28, 2019, pp. 1-16.
Official Communication for U.S. Appl. No. 14/033,130 dated Apr. 10, 2019, pp. 1-9.
Official Communication for U.S. Appl. No. 14/180,308 dated Feb. 26, 2019, pp. 1-28.
Official Communication for U.S. Appl. No. 14/867,552 dated Feb. 11, 2019, pp. 1-8.
Official Communication for U.S. Appl. No. 14/981,747 dated Dec. 26, 2018, pp. 1-50.
Official Communication for U.S. Appl. No. 15/260,221 dated Jan. 8, 2019, pp. 1-19.
Official Communication for U.S. Appl. No. 15/271,013 dated Mar. 28, 2019, pp. 1-53.
Official Communication for U.S. Appl. No. 15/351,313 dated Apr. 1, 2019, pp. 1-31.
Official Communication for U.S. Appl. No. 15/585,945 dated Feb. 6, 2019, pp. 1-15.
Official Communication for U.S. Appl. No. 15/859,058 dated Mar. 25, 2019, pp. 1-24.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 14/981,747 dated May 8, 2019, pp. 1-77.
Official Communication for U.S. Appl. No. 15/271,013 dated Jun. 14, 2019, pp. 1-8.
Official Communication for U.S. Appl. No. 14/846,349 dated Oct. 18, 2019, pp. 1-52.

(56) References Cited

OTHER PUBLICATIONS

Official Communication for U.S. Appl. No. 14/981,747 dated Oct. 24, 2019, pp. 1-62.
Official Communication for U.S. Appl. No. 14/180,308 dated Dec. 10, 2019, pp. 1-29.
Official Communication for U.S. Appl. No. 15/271,013 dated Nov. 21, 2019, pp. 1-108.
Daytime vs Night display on Garmin GPS, POI Factory, Jun. 2008, http://www.poi-factory.com/node/14562 (Year: 2008), pp. 1-3.
Official Communication for U.S. Appl. No. 13/917,503 dated Dec. 31, 2019, pp. 1-28.
Official Communication for U.S. Appl. No. 14/846,349 dated Jan. 21, 2020, pp. 1-6.
Official Communication for U.S. Appl. No. 14/180,308 dated Mar. 9, 2020, pp. 1-5.
Beraldi, et al., "A Clustering Approach for Scenario Tree Reduction: an Application to a Stochastic Programming Portfolio Optimization Problem," TOP, vol. 22, No. 3, 2014, pp. 934-949.
Official Communication for U.S. Appl. No. 15/271,013 dated Mar. 23, 2020, pp. 1-45.
Official Communication for U.S. Appl. No. 14/981,747 dated Apr. 23, 2020, pp. 1-14.
Office Communication for U.S. Appl. No. 13/917,503 dated May 7, 2020, pp. 1-25.
Office Communication for U.S. Appl. No. 14/180,308 dated May 11, 2020, pp. 1-18.
Office Communication for U.S. Appl. No. 14/846,349 dated Jun. 8, 2020, pp. 1-32.
Office Communication for U.S. Appl. No. 15/271,013 dated Jun. 15, 2020, pp. 1-6.
Office Communication for U.S. Appl. No. 13/917,503 dated Jul. 29, 2020, pp. 1-6.
Examination Report for UK Patent Application No. GB1617238.9 dated Sep. 24, 2020, pp. 1-7.
Office Communication for U.S. Appl. No. 14/180,308 dated Oct. 13, 2020, pp. 1-17.
Office Communication for U.S. Appl. No. 13/917,503 dated Nov. 27, 2020, pp. 1-23.
Office Communication for U.S. Appl. No. 14/846,349 dated Dec. 9, 2020, pp. 1-12.
Office Communication for U.S. Appl. No. 15/271,013 dated Dec. 10, 2020, pp. 1-39.
Office Communication for U.S. Appl. No. 14/180,308 dated Jan. 11, 2021, pp. 1-4.
Office Communication for U.S. Appl. No. 14/846,349 dated Feb. 12, 2021, pp. 1-4.
Examination Report for UK Patent Application No. GB1617238.9 dated Feb. 24, 2021, pp. 1-7.
Examination Report for UK Patent Application No. GB1621064.3 dated Feb. 26, 2021, pp. 1-3.
Office Communication for U.S. Appl. No. 14/846,349 dated Mar. 26, 2021, pp. 1-12.
Office Communication for U.S. Appl. No. 14/180,308 dated Apr. 6, 2021, pp. 1-19.
Examination Report for UK Patent Application No. GB1621092.4 dated Jan. 28, 2021, pp. 1-3.
Examination Report for UK Patent Application No. GB1722189.6 dated Jul. 8, 2021, pp. 1-4.
Office Communication for U.S. Appl. No. 14/846,349 dated Jul. 12, 2021, pp. 1-11.
"Apptio TBM Unified Model™ (ATUM™): The Standard Cost Model for IT," Apptio, 2014, pp. 1-13.
Office Communication for U.S. Appl. No. 14/180,308 dated Sep. 23, 2021, pp. 1-11.
Examination Report for UK Patent Application No. GB1722189.6 dated Jan. 12, 2022, pp. 1-5.

* cited by examiner

DATA

ANNOTATION TABLE

| CATEGORY | ROW | COLUMN | NOTE | PIN INFO | ID |
|---|---|---|---|---|---|
| BUDGET_1 | 2 | C | RAW DATA | | |
| SALES_10 | 5 | G | | | |
| RESEARCH_58 | 58 | F | | | |
| BUDGET_12 | 34 | B | | | |
| MARKETING_5 | 112 | Z | | | |
| IT INTERNAL_19 | 15 | H | | | |
| IT EXTERNAL_5 | 8 | T | | | |
| BUDGET_12 | 26 | V | | | |
| ... | ... | ... | ... | ... | ... |

*FIG. 6*

BINDING ANNOTATIONS TO DATA OBJECTS

TECHNICAL FIELD

The present invention relates generally to associating annotations with data, and more particularly, but not exclusively to displaying data in different visualizations with the same persistently associated annotations.

BACKGROUND

Organizations employ various models to allocate resources over time. For some resource allocation techniques, the complexity and accuracy of the underlying data models may change over time as the number of tracked activities are completed, repurposed or abandoned. Therefore, for larger organizations, computerized visualization tools are often required to assist in managing relevant resource models over time and predicting future resource allocations. In some cases, the large number of items and entities required for enterprise scale resource modeling over time may make resource models difficult to understand even with visualization tools. Consequently, additional information is often provided to clarify the complexity of the models, objects, and entities based on the underlying data. Although this additional information has been associated with visualizations, this information is often not automatically associated with and displayed with the underlying data regardless of how it is used in visualizations of reports, graphs, and other types of visual presentations. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 6 illustrates an exemplary data structure for an annotation table for one or more of the various embodiments;

DETAILED DESCRIPTION OF THE EMBODIMENTS

Figure 1:
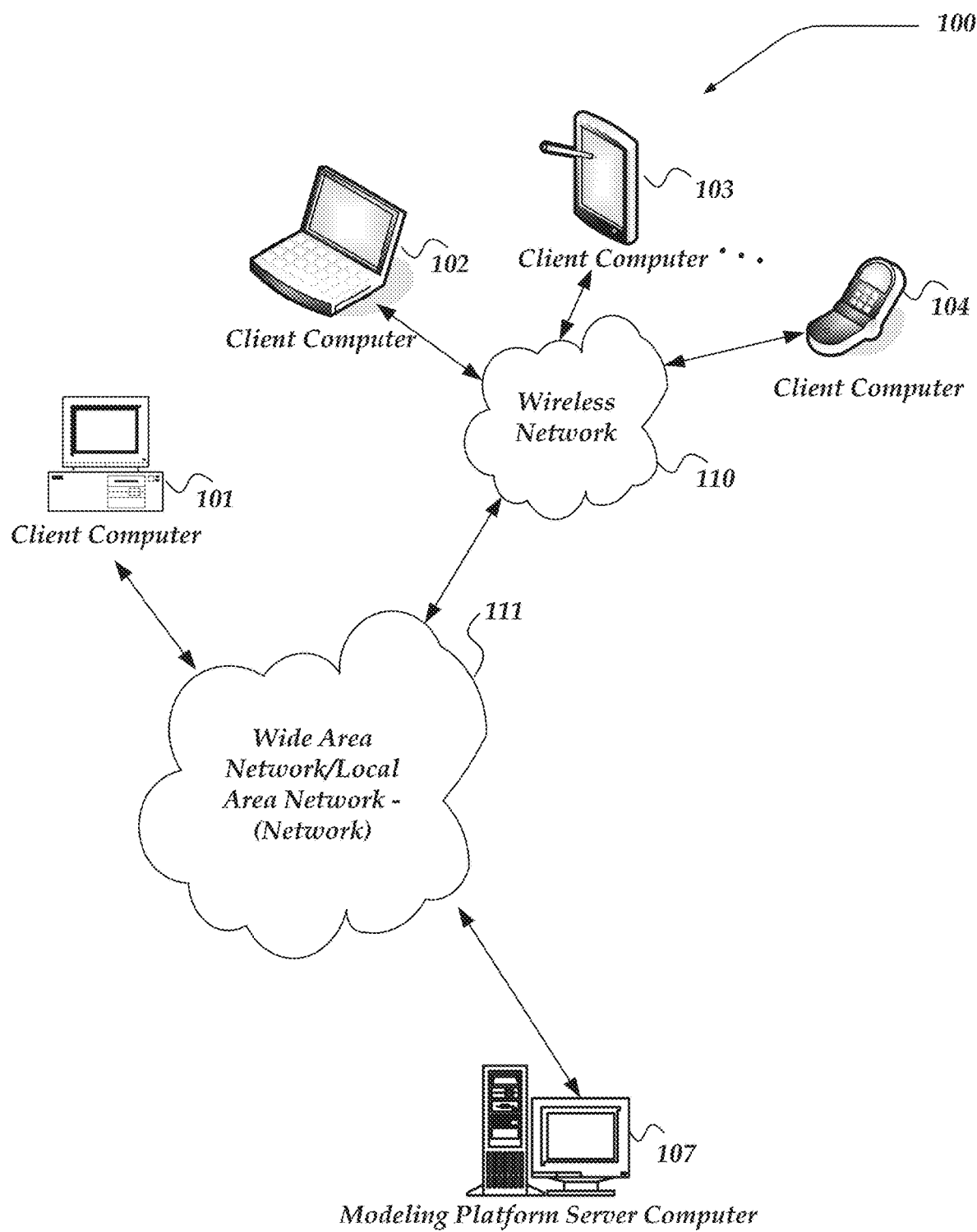
FIG. 1 illustrates a system diagram showing components of an environment in which one or more of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources and/or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "data model," or "model object" refers to a set and/or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category and/or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. In some embodiments, datasets may be ingested to produce data model objects for data models. Non-tabular datasets can also take the form of marked up strings of characters, such as an XML file.

As used herein, the term "data object" may refer to a single datum, one or more different types of data, or a collection of data such as a dataset. Also, the term "data object value" may refer to one or more fields of a data object. Additionally, the data object value may refer to a singular field, an aggregation of one or more types of fields, or a computed value of one or more fields of a data object.

As used herein, the term "source object" refers to a model object in a data model that may be providing resource values that may be allocated to one or more other model objects (target objects).

As used herein, the term "target object" refers to a model object in a data model that may be allocated resources from one or more other model objects (source objects).

As used herein, the term "benchmarking information" refers to values that are computers and/or generated from various sources, such as, community models, third-party/external information, industry surveys, or the like. Benchmarking information may be ratios, ranges, averages, means, median, min/max values, time-series, regressions, or the like, or combination thereof, related to values associated with one or more model elements. A benchmarking engine may be arranged to generate various types of benchmarking information depending on the benchmark types, model types, model compositions, configurations, user input, or the like, or combination thereof.

As used herein, the "validity range" refers to the time range that various model values are considered valid. Model values associated with validity ranges may vary depending on the application of the model, and may include, data object property value, object property set, line item property value, allocation rules, or the like. Validity ranges may be unbounded such that they have a start time but no defined end time.

As used herein, the term "validity start," "validity start time" refers to the beginning of validity range associated with a modeled object or item.

As used herein, the term "validity end," "validity end time" refers to the end of validity range associated with a modeled object or item.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing annotations over a network for visualizations. An annotation engine enables users to associate a data object value with any number of notes, comments, videos, graphics, pictures, audio, references, links, or any other information. A visualization engine generates visualizations that include annotation identifiers when the visualizations include data object values that are associated with annotations and the type of visualization is approved for use with the annotations. The annotation may be pinned to a location in a visualization or to a graph of a query to a data structure such as a table in a database.

In one or more of the various embodiments, an annotation engine is employed to receive associations of annotations with data object values. An association and an annotation for each data object value is persistently stored. Also, the annotation engine determines annotation metadata associated with each stored annotation. The annotation metadata includes information including one or more types of visualizations that is approved for use with the annotation and the data object value that is associated with the annotation. Additionally, a visualization engine is employed to receive annotation metadata from the annotation engine when a type of visualization is selected for display that employs one or more data object values that are associated with the one or more annotations. Further, when the annotation metadata affirms use of the one or more annotations associated with the one or more data object values that are employed by the selected type of visualization, one or more annotation indicators are included in the selected display of the visualization. Moreover, a selection of the annotation indicator in the visualization enables access to the one or more annotations associated with the one or more data object values.

In one or more of the various embodiments, a modeling engine generates a data model based on a plurality of allocation rules and a plurality of data objects. Also, the data model and values of the plurality of data objects are provided to the visualization engine for use in generating a visualization of the data model for display. The visualization engine employs each annotation metadata associated with the plurality of data objects' values to determine whether to include one or more annotation indicators in the visualization.

In one or more of the various embodiments, the annotation engine receives separate pin information that is associated with an annotation. The pin information includes one or more of user roles, approved types of visualizations, time period for access to the annotation, user permissions, graphs of queries for data object values, and level of granularity for access to associated data object values.

In one or more of the various embodiments, the annotation engine precomputes one or more queries for one or more annotations that are associated with one or more annotation indicators included with the displayed visualization. Also, in one or more of the various embodiments, one annotation indicator is employed to reference a grouping of a plurality of annotations associated with data object values employed by a displayed visualization.

In one of the various embodiments, filtering is provided for one more queries of annotations that are associated with the displayed visualization. The filters include one or more of data object class, data object type, time stamp, annotation type, author, permission, role, visualization type, or link. Also, in one or more of the embodiments, the annotations are stored in an annotation table that includes, one or more of a category (type), row, column, note (text of annotation), pin information and ID value. Additionally, in one or more embodiments, the annotation identifier comprises one or more of an icon, a graphic, text, a color, a value, a picture, a video, a preview of an annotation, summation of an annotation, a title of an annotation, or a visual effect.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")—(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In one or more of the various embodiments, at least some of client computers 102-104 may operate over wired or wireless network. Today, many of these devices include a capability to access or otherwise communicate over a network such as network 111 or wireless network 110. Moreover, client computers 102-104 may access various computing applications, including a browser, or other web-based application.

In one or more of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one or more of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one or more of the various embodiments, a user of the client computer may employ the browser application to perform various actions over a network.

Client computers 101-104 also may include at least one other client application that is configured to receive or send data, including resource allocation information, report requests (e.g., queries) between another computing device. Client applications may include a capability to provide requests or receive data relating to the data models, reports, project information, allocation rules, or the like. The client application may provide data representing assignment or resource allocation changes, selecting reports, providing user annotation information, selecting templates, editing cost allocations between or among categories, generating or modifying allocation rules, or the like. In one or more of the various embodiments, client applications may receive or generate data related to data models and may generate tables and relationships between and among the data. In one or more of the various embodiments, client computers 101-104 may view or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, or other communication protocols, architectures, models, or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
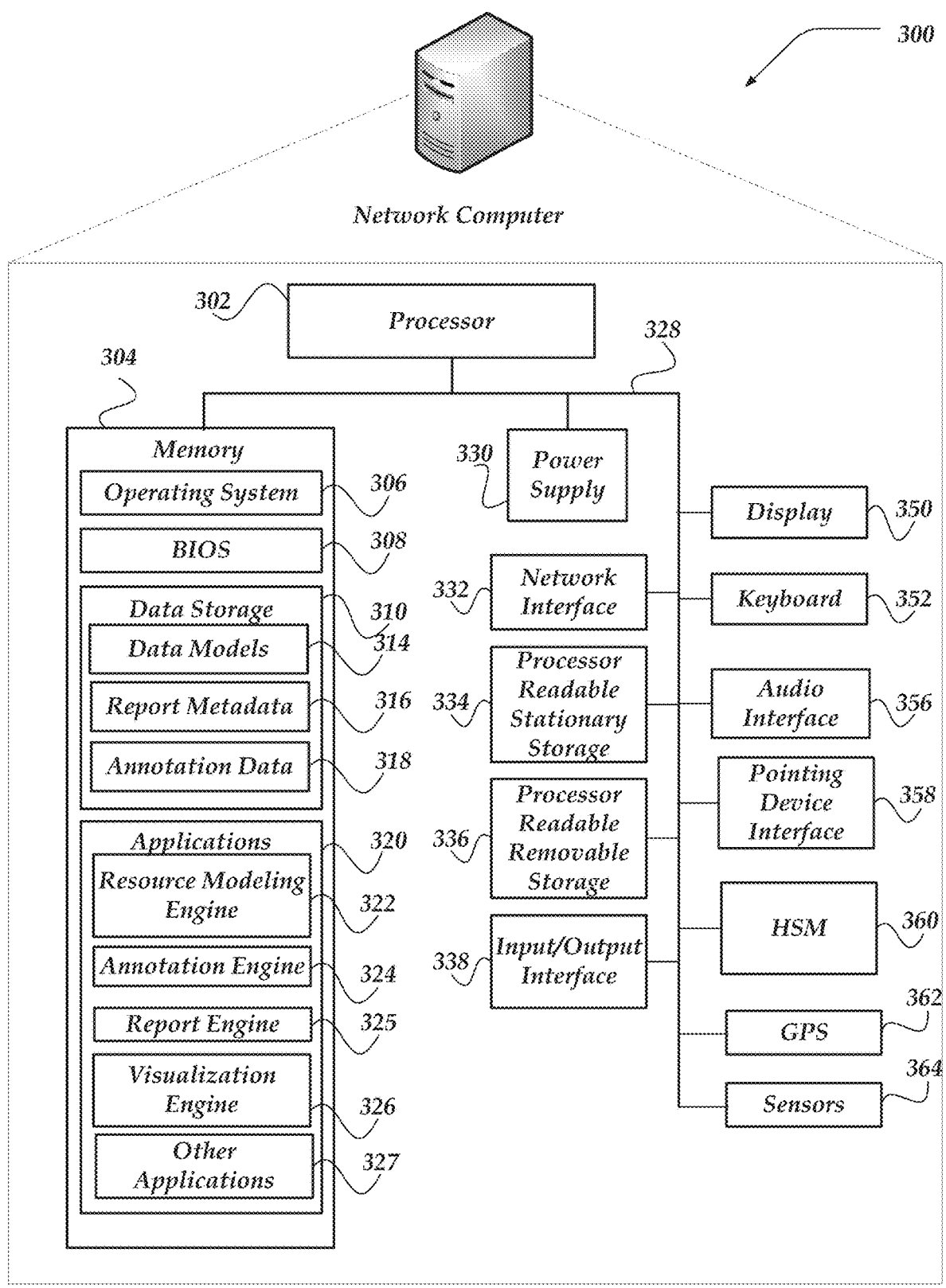
FIG. 3 illustrates an exemplary network computer that may be included in one or more of the various embodiments of a system.

Modeling platform server computer 107 may include virtually any network computer usable to perform data processing operation that may be used for generating data models, allocation rules, recursive allocation rules, resource allocations, displays or reports thereof, such as network computer 300 of FIG. 3. In one or more of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, or the like. Furthermore, modeling platform server computer 107 may include or generate one or more reports for visualizing the generated resource allocations, data models, allocation rules, or the like. Additionally, although not shown, modeling platform server computer 107 may include one or more visualization engines and one or more annotation engines. The annotation engine enables users to associate notes, comments, or other information with a data object value. And the visualization engine generates visualizations that include annotation identifiers when the visualizations include data object values that are associated with annotations and the type of visualization is approved for use with the annotations.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in one or more of the various embodiments, modeling platform server computer 107 may be distributed over a plurality of network computers or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client Computer

Figure 2:
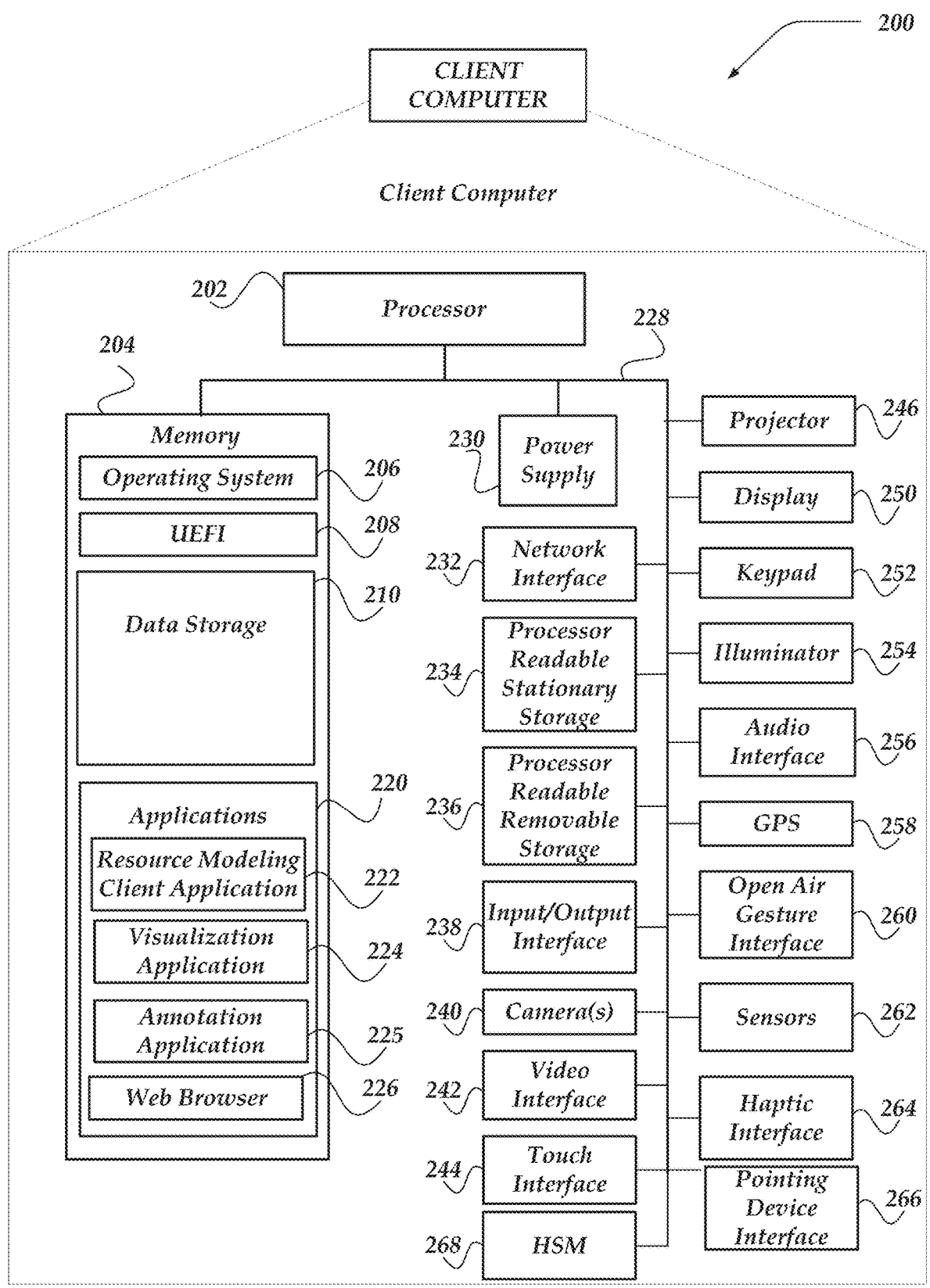
FIG. 2 shows an exemplary client computer that may be included in one or more of the various embodiments of a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In one or more of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In one or more of the various embodiments, applications, such as, operating system 206, resource modeling client application 222, visualization application, 224, annotation application, 225, web browser 226, or the like, may be arranged to employ geo-location information to select one or more localization features, such as, time zones, languages, currencies, calendar formatting, local holidays, local weather conditions, culturally sensitive images, or the like. Localization features may be used in data objects, data models, reports, file systems, user-interfaces, as well as internal processes or databases. In one or more of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java or JavaScript virtual machine modules that enable control of hardware components or operating system operations via Java application programs or JavaScript programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, resource modeling client application 222. In one or more of the various embodiments, resource modeling client application 222 may be used to exchange communications to and from modeling platform server computer 107, including, but not limited to, queries, searches, API calls, reports, configuration information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In one or more embodiment, the microcontrollers be system-on-a-chips (SOCs) that may directly execute their own embedded logic to perform actions and access their own internal memory and their own external Input and Output Interfaces (e.g., hardware pins or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In one or more embodiments, however, network computer 300 may, through other components, provide other information that may be employed to determine a physical location of the client computer, including for example, a Media Access Control (MAC) address, IP address, and the like.

In one or more of the various embodiments, applications, such as, operating system 306, resource modeling engine 322, annotation engine 323, report engine 324, visualization engine 325, web services 326, other applications 327, or the like, may be arranged to employ geo-location information to select one or more localization features, such as, date formats, time formats, units, colors, fonts, punctuation, time zones, languages, local holidays, local weather, culturally sensitive images, currencies, calendar formatting, or the like. Localization features may be used in data objects, data models, reports, file systems, user-interfaces, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 110 or network 111.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect or measure data that is external to network computer 300

In one or more embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of non-transitory computer readable or writeable media. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, reference metadata 316, annotation data 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, annotation engine 324, report engine 325, visualization engine 326, other applications 327, such as web services or the like, that may perform actions further described below. In one or more of the various embodiments, one or more of the applications may be implemented as modules or components of another application. Further, in one or more of the various embodiments, applications may be implemented as operating system extensions, modules, plugins, or the like.

In one or more of the various embodiments, applications, such as, resource modeling engine 322, annotation engine 324, report engine 325, visualization engine 326, other applications 327, or the like, may be arranged to employ geo-location information to select one or more localization features, such as, time zones, languages, currencies, calendar formatting, local holidays, local weather, culturally sensitive images, or the like. Localization features may be used in user-interfaces, reports, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 108 or network 111.

Furthermore, in one or more of the various embodiments, resource modeling engine 322, annotation engine 324, report engine 325, visualization engine 326, other applications 327, or the like, may be operative in a cloud-based computing environment. In one or more of the various embodiments, these engines, and others, that comprise the modeling platform that may be executing within virtual machines or virtual servers that may be managed in a cloud-based based computing environment. In one or more of the various embodiments, in this context applications including the engines may flow from one physical network computer within the cloud-based environment to another depending on performance and scaling considerations automatically managed by the cloud computing environment. Likewise, in one or more of the various embodiments, virtual machines or virtual servers dedicated to resource modeling engine 322, annotation engine 324, report engine 325, visualization engine 326, other applications 327, or the like, may be provisioned and de-commissioned automatically.

Further, in some embodiments, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In one or more embodiment, the one or more microcontrollers may directly execute embedded logic to perform actions and access their own internal memory and their own external Input and Output Interfaces (e.g., hardware pins or wireless transceivers) to perform actions. E.g., they may be arranged as Systems On Chips (SOCs).

In one or more of the various embodiments, resource modeling engine 322, annotation engine 324, report engine 325, and visualization engine 326 may be instantiated to enable a user to generate project plans, allocation rules, data models, reports, visualizations, annotations, what-if-analysis, or the like. Also in one or more of the various embodiments, resource modeling engine 322, annotation engine 324, report engine 325, and visualization engine 326 may employ processes, or parts of processes, similar to those described below.

Illustrative Logical System Architecture

Figure 4:
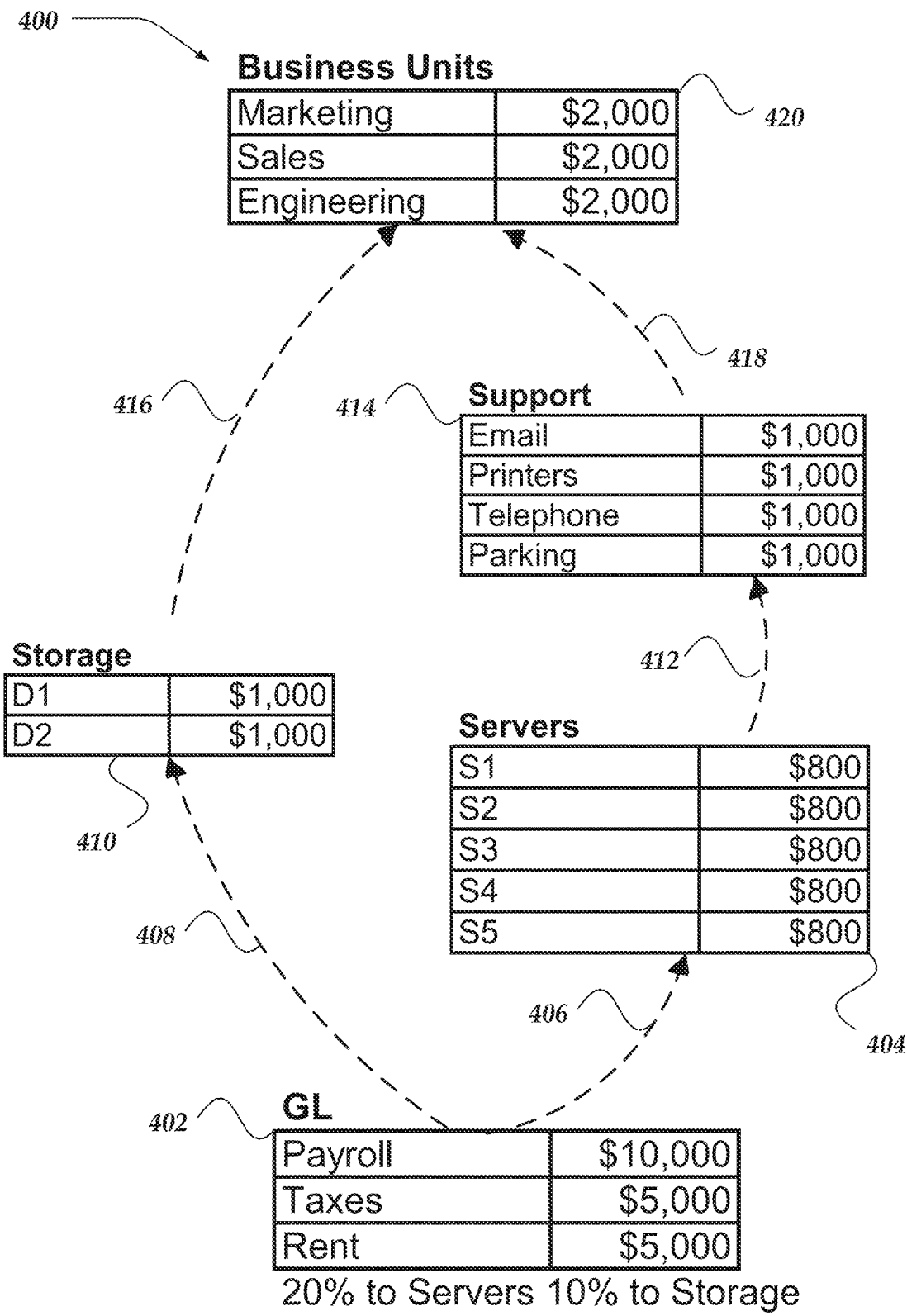
FIG. 4 illustrates a portion of a logical architecture for a data model that may be enabled by one or more of the various embodiments.
Figure 5:
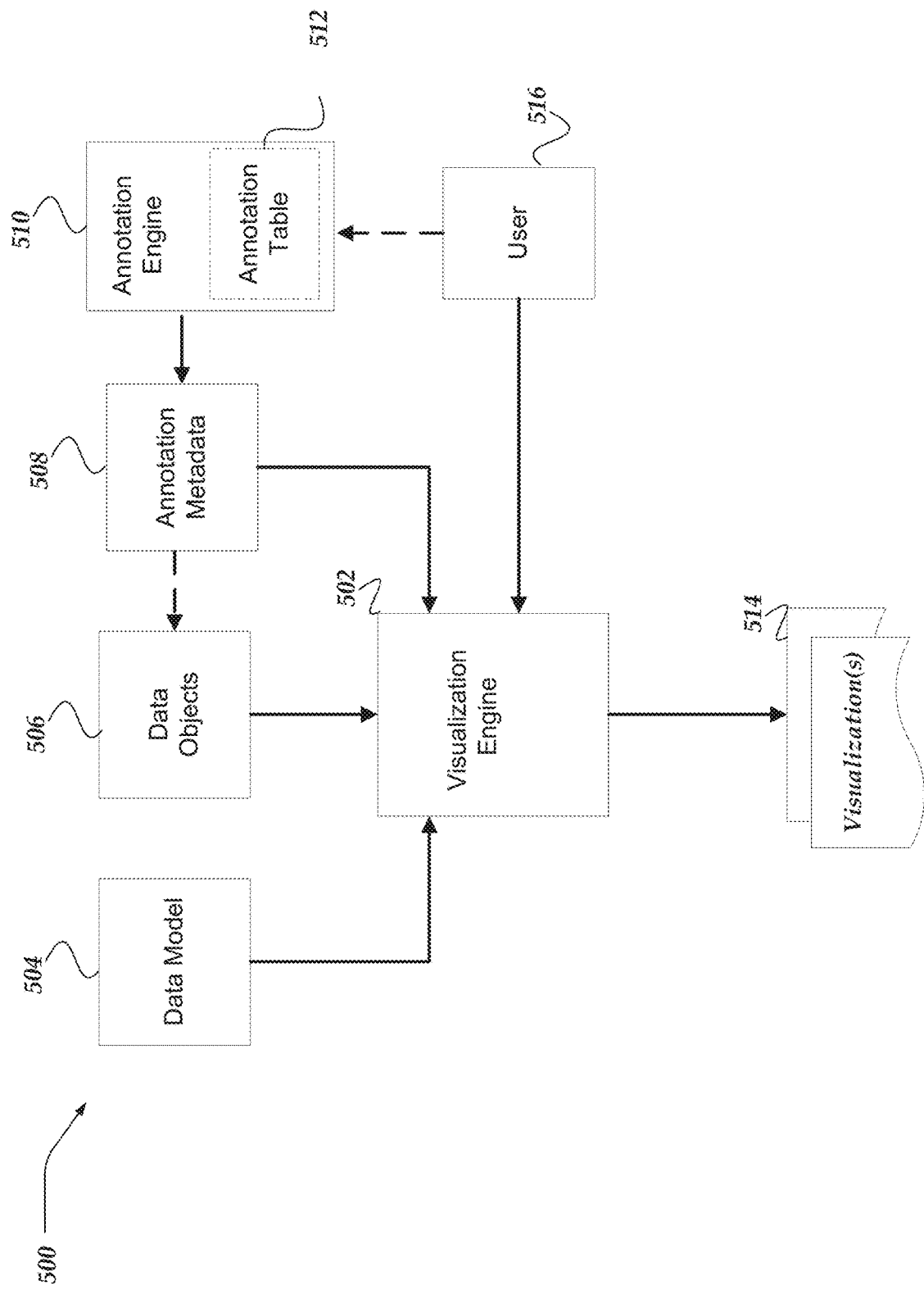
FIG. 5 shows an exemplary system architecture for one or more of the various embodiments.

FIGS. 4-5 are presented to illustrate logical architectures at least one of the various embodiments for report generation based on user responsibility.

FIG. 4 illustrates a portion of a logical architecture for data model 400 that may be enabled by at least one of the various embodiments.

In one or more of the various embodiments, model 400 may have five objects: GL 402, Servers 404, Storage 410, Support 414, and Business Units 420. In one or more of the various embodiments, each data object in data models contains or references a set of data object values which are also referred to as resource cost line items herein. For example, GL 402 includes resource cost line items for Payroll, Taxes and Rent. Likewise, Support 414 includes resource cost line items Email, Printers, Telephone, and Parking. In one or more of the various embodiments, each resource cost line item has one or more associated resource values. For example, Storage 410 has two resource cost line items, D1, and D2 (e.g., disk drives) having associated resource cost values of $1000 each.

Allocation rules may be used to connect objects of data model 400. In one or more of the various embodiments, allocation rules may show how resources flow between the objects modeled by data model 400. Resulting in a graph where the objects may be represented as nodes and the allocation rules may be represented as edges. In one or more of the various embodiments, generally a data model may be represented by a directed acyclic graph but that is not a requirement for an operative model. In one or more of the various embodiments, a model graph may contain cycles that are resolved or estimated using mathematical techniques, including but not limited to Gaussian elimination, Cholesky decomposition or Newton's method.

In one or more of the various embodiments, data models may be arranged to be stored in self-referential database such that some or all of the data objects for a data model may be stored in the same table. Accordingly, different records in the table may be arranged to include references to other records in the same table that also represent data model objects for a data model. Accordingly, in some embodiments, the graph structure of a data model may be represented in a single table rather than require normalized databased tables. Accordingly, in some embodiments, the performance of one or more processors, such as, processor 302 is improved because data models may be traversed by scanning through a single table rather than having to execute slower performing database query joins that may consume more processor resources or memory resources, or the like.

In one or more of the various embodiments, allocation rule 406 represents a rule allocating 20% of the resources of object GL 402 (source object) to Servers object 404 (target object). In this example, GL 402 includes resources values at $20,000, thus 20% of $20,000 (e.g., $4,000) flows based on allocation rule 406 to Servers 404. Likewise, allocation rule 408 may allocate $2,000 from GL 402 to Storage 410. The other allocation rules in data model 400 allocate 100% of the resource to the next data object: allocation rule 412 directs 100% of the resources (e.g., $4,000) to flow to Support 414; allocation rule 418 directs 100% of the resources in Support (e.g., $4,000) to flow to Business Units 420; and allocation rule 416 directs 100% of the resources from Storage 410 to flow to Business Units 420.

In one or more of the various embodiments, resources that flow into a data object may be allocated among the included resource cost line items. In one or more of the various embodiments, each object may have one or more rules that may describe how resources (e.g., assignment ratios) coming into to a data object are allocated or assigned to resource cost line items. In this example, for data objects 404, 410, 414, and 420, simple allocation rules assign the resources in the object evenly among the resource cost line items comprising each data object. Each may have its own allocations rules and assignment ratios, for example, GL 402 in this non-limiting example, the assignment ratio for resource cost line items may be 50% to Payroll, 25% to Taxes, and 25% to Rent.

In one or more of the various embodiments, an assignment ratio may represent how the resources in an organization may be assigned to the actual resource cost line items. In one or more of the various embodiments, allocation rules may be executed to distribute the resources based on definitions provided by the users or administrators who designed the data model. In one or more of the various embodiments, the assignment ratios and allocation rules may be modified as part of the modeling process.

The data model 400 is a simplified model useful for facilitating discussion and understanding of the embodiments. Allocation rules for models of large organizations can be numerous and complex. However, model 400 is at least sufficient to enable one of ordinary skill in the art to practice what is claimed herein.

FIG. 5 illustrates an overview of system 500 for managing annotations for visualizations of data object values and corresponding data models. Annotation engine 510 is configured to receive annotations to data object values from one or more users. These annotations can include notes, comments, videos, graphics, pictures, audio, links, references, or any other information related to a value of a data object. The annotation can be associated with any type of data, type of data object, or type of value. The annotations are persistently stored in annotation table 512 that is at least accessible by the annotation engine or the visualization engine. Also, user 516 may associate various other information with the annotation in the table. For example, this other information may include a category, a row, a column, a note (annotation text), an ID, and pin information. Further, the annotation engine 510 employs the contents of the annotation table 512 to generate annotation metadata 508 that is associated with a value of data object 506.

When a different or the same user selects visualization 514 for display of one or more data object values or provides a query for one or more annotations, visualization engine 502 employs data objects 506, data model 504, and annotation metadata 508 to generate selected visualization 514 for user 516. When the annotation metadata indicates that selected visualization 514 includes one or more data object values that are associated with an annotation and selected visualization 514 and the different or the same user are permitted to view the annotation, an annotation identifier is included in the display of the selected visualization to user 516.

Alternatively, a user may query the annotation table for an annotation to be used in a type of visualization or context that was not known at the time the annotation was entered in the table. However, a graph of the query can be used to identify the annotation for display in the new type of context/visualization.

FIG. 6 illustrates an exemplary data structure for annotation table 600, which includes a category (type), a row, a column, a note (annotation text), an ID, and pin information, and the like. Further, the annotation engine employs the contents of annotation table 600 to generate annotation metadata that is associated with a value of data object. The annotation metadata may also include a graph of a query for the annotation. Although not shown, an annotation may also be associated with one or more of a time stamp and a particular period of time that the annotation is available for use with a visualization that is permitted to employ a data object value associated with the annotation. Further, although not shown, an annotation may also be associated with one or more of roles or permissions for users to view the annotation. Additionally, the pin information may identify one or more types of visualizations or content that is permitted for use with an annotation associated with a data object value. Also, the pin information may identify a graph of a query for the annotation or the data object value, widget, cell of a spreadsheet, or a query. Further, the pin information may provide one or more permitted levels of granularity for display of an annotation that is associated with the data object value. Additionally, since the annotation may be pinned to a graph of a query, the annotation may be used to other visualizations or contexts that were not known at the time the annotation was included in the annotation table. Further, the annotation table may be a flat file, or a database table where every field of an annotation entry may be employed as a key to query the table.

Illustrative Use Cases

Figure 7A:
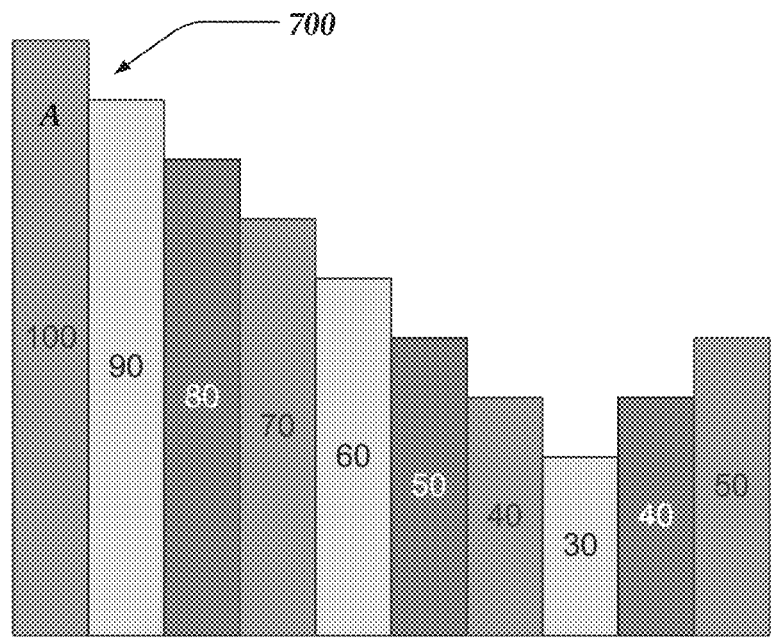
FIG. 7A shows an exemplary visualization of a bar graph that includes an annotation cue for one or more of the various embodiments.
Figure 7B:
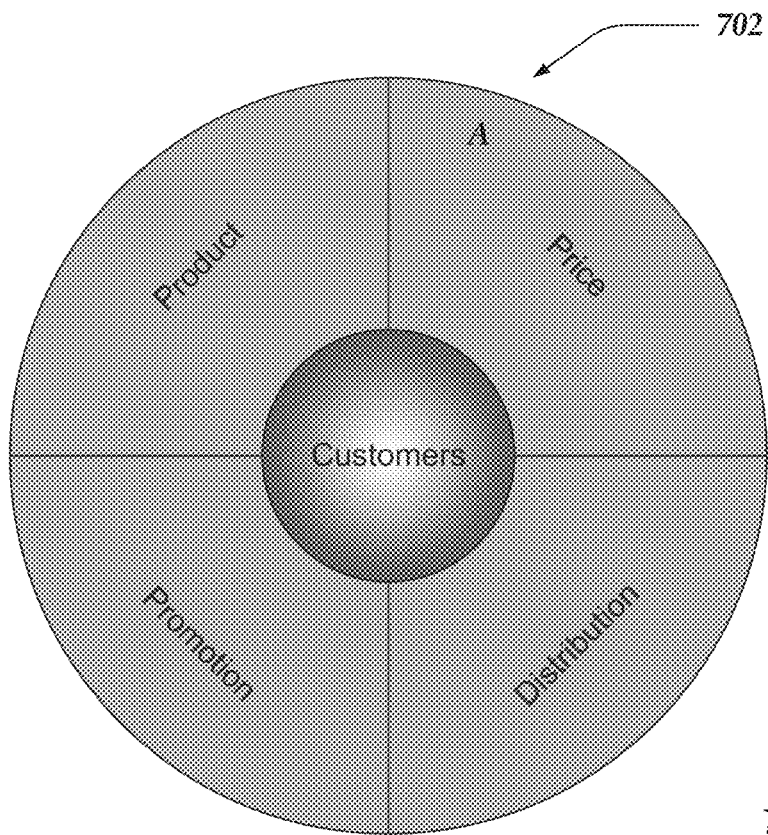
FIG. 7B illustrates an exemplary visualization of a pie chart that includes an annotation cue for one or more of the various embodiments.

FIGS. 7A-7B are presented to illustrate illustrative use of annotations for one or more of the various embodiments.

FIG. 7A shows a visualization of a bar graph where annotation identifier 700 is included in the far-right column of the bar graph. Although not shown, selection of annotation identifier 700 causes a subsequent display to a user of the annotation associated with annotation identifier 700.

FIG. 7B shows a visualization of a pie chart where annotation identifier 702 is included in the "price" quadrant of the pie chart. Although not shown, selection of annotation identifier 702 causes a subsequent display to a user of the annotation associated with annotation identifier 702.

Generalized Operations

Figure 8:
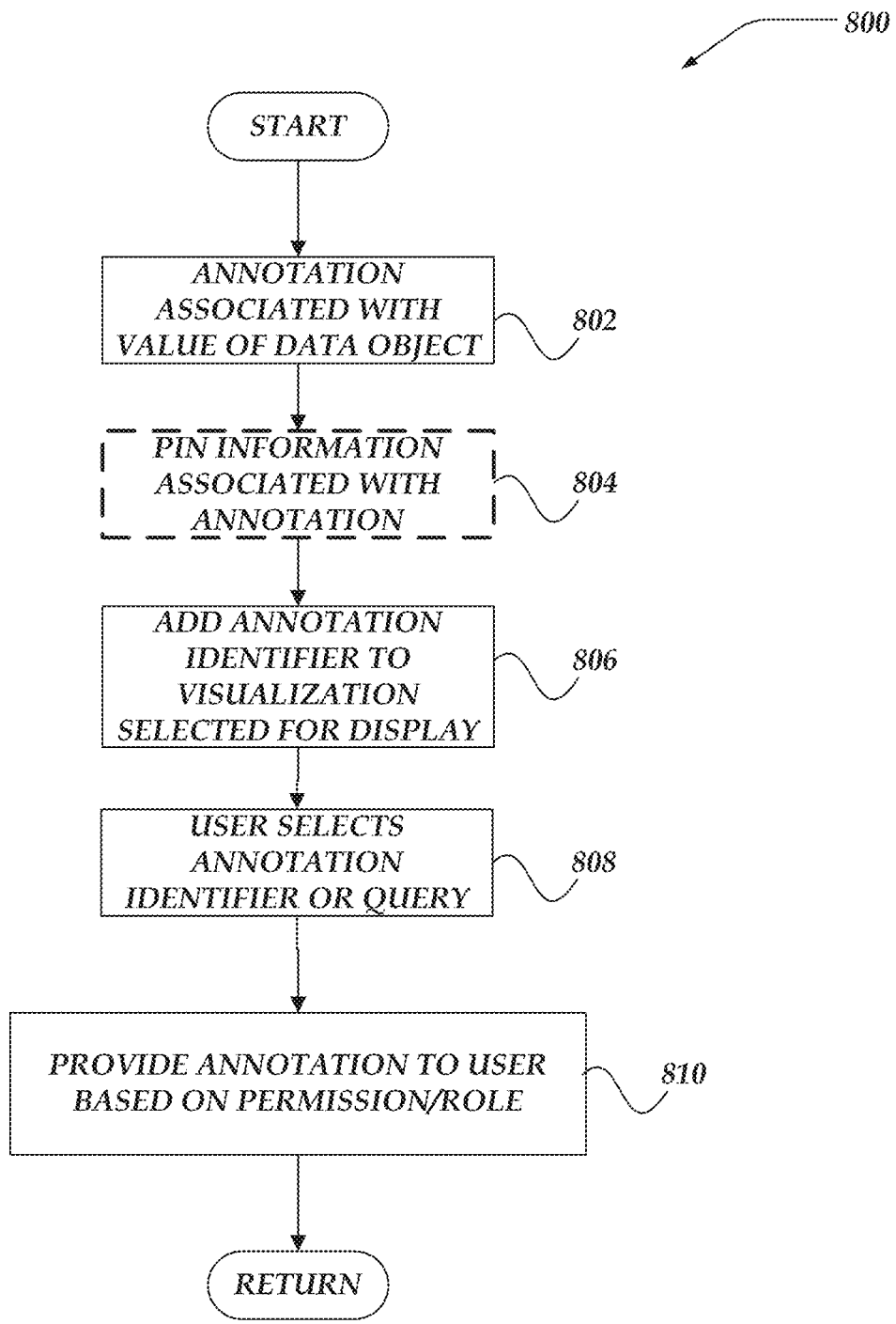
FIG. 8 shows a flow chart for a process for providing an annotation for data that is subsequently employed to present one or more visualizations that include the data.
Figure 9:
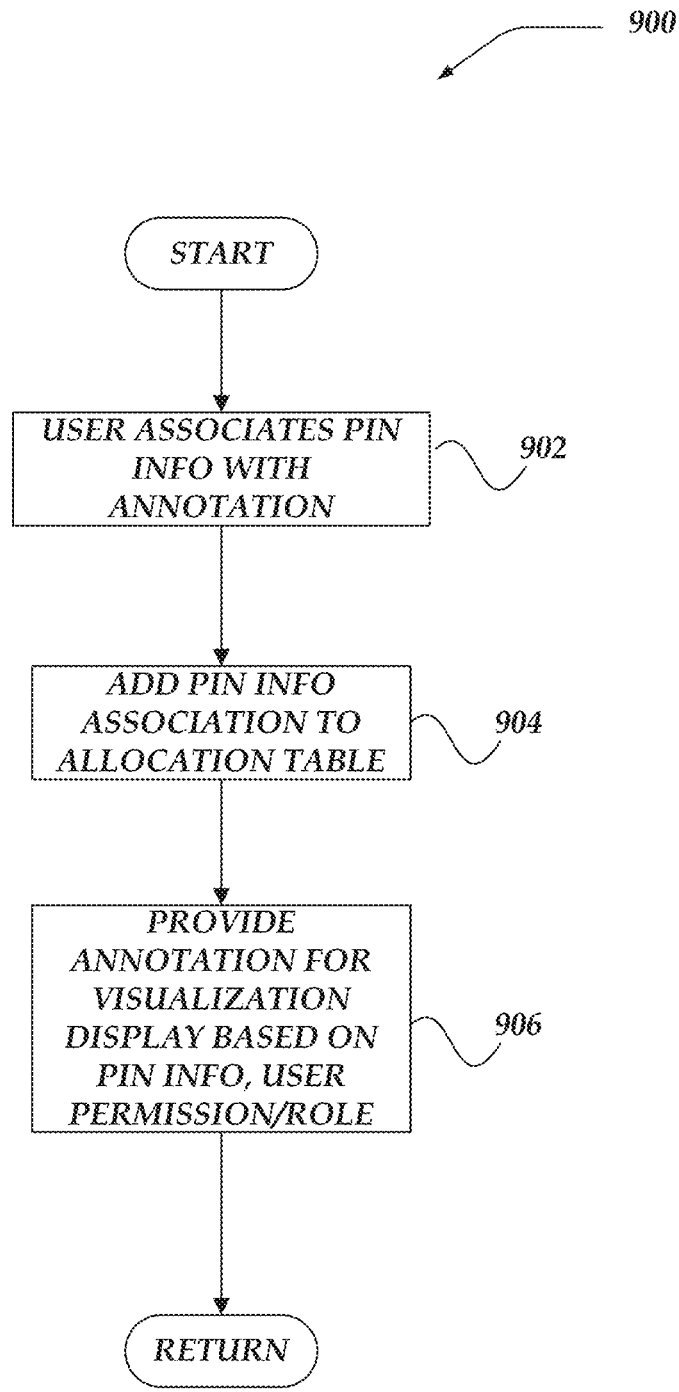
FIG. 9 illustrates a flow chart for a process for pinning an association of an annotation with one or more types of visualizations in accordance with the one or more various embodiments.

FIGS. 8 and 9 are presented to illustrate flow charts for managing use of annotations for one or more of the various embodiments.

FIG. 8 shows flow chart 800 for managing annotations for display in selected visualizations. Moving from a start block, the process advances to block 802 where a user provides an annotation associated with a value of a data object. Generally, the annotation includes content such as text in the form of a note. However, the annotation can include any other type of content too. Also, the annotation may include one or more of permissions and roles that a user must meet to view the annotation, and/or a period of time that the annotation is available for viewing. Further, the annotation may include one or more types of visualizations that are approved to include an annotation identifier for an annotation that is associated with a value of a data object that used by the one or more types of approved visualizations.

At block 804, the user may optionally provide pin information for an annotation. The pin information may identify one or more types of visualizations or content that is permitted for use with an annotation associated with a data object value. Also, the pin information may identify a particular graph of a query to the annotation or the associated data object value, widget, cell of a spreadsheet, or a query. Further, the pin information may provide one or more permitted levels of granularity for display of an annotation that is associated with the data object value.

At block 806, a user selects a visualization for display or provides a query for the data object value or the annotation. Annotation metadata is employed to determine whether the selected visualization or query will use a value of a data object that is associated with an annotation and also affirms whether the selected visualization is approved for display of the annotation. When affirmed, the selected visualization includes an annotation identifier for the annotation.

Stepping to block 808, the user selects the annotation identifier or presents a query. Flowing to block 810, the permissions and/or roles of the user are used to affirm whether the user is approved to view the annotation or resolve the query. When affirmed, the annotation is displayed to the user. Additionally, the user can select a level of granularity for the association of the annotation with query or the value of the data object. This level of granularity is typically at or above a first instance of association of the annotation with the value of the data object. Next, the process returns to performing other actions.

FIG. 9 shows flow chart 900 for managing pin information for annotations. Moving from a start block, the process advances to block 902 where a user associates pin information with an annotation. At block 904, the pin information is persistently stored in an allocation table.

Moving to block 906, a user selects a visualization for display. Annotation metadata is employed to determine whether the selected visualization employs a value of a data object that is associated with an annotation or an associated query and also affirms whether the selected visualization is approved for display of the annotation. When affirmed, the selected visualization includes an annotation identifier for the annotation.

When the user selects the annotation identifier, the pin information is employed to identify a graph of a query, widget, or cell of a spreadsheet. Further, the pin information may provide one or more permitted levels of granularity for display of an annotation that is associated with the data object value. Next, the annotation is provided for display to the user.

What is claimed as new and desired to be protected by Letters Patent of the United States is:

1. A method for managing annotations over a network, wherein execution of instructions by one or more processors performs actions of the method, comprising:

instantiating an annotation engine to perform actions, including:
receiving associations of one or more annotations with one or more data object values, wherein an association and an annotation for each data object value is persistently stored as a data object for a data model together in a self-referential database, wherein a graph structure for the data model is represented in one table to reduce an amount of processing resources employed to perform one or more queries for the one or more data object values, and wherein the graph structure is a representation of a directed acyclic graph that includes each data object of the data model represented as a node and each allocation rule of the data model represented as an edge in the self-referential database;
receiving a query of an annotation table by a user;
in response to the query of the annotation table by the user, determining annotation metadata and an annotation identifier associated with each stored annotation, wherein the annotation metadata includes information including one or more types of visualizations that is approved for use with the annotation and the data object value that is associated with the annotation based on a graph of the query of the annotation, and wherein the annotation identifier is selectable by the user to cause display of the annotation with the one or more approved types of visualizations that were known and unknown prior to inclusion of the annotation in the annotation table; and
for one or more locations in the one or more types of visualizations, providing separate pin information that includes one or more of an association of a level of granularity for displaying at least one annotation above a first instance of its association with at least one data object value at a location in the one or more types of visualizations, a user role, an approved type of visualization, a time period for access to the at least one annotation when it is available for use with the one or more types of visualizations that is permitted to employ the at least one data object value associated with the at least one annotation, a user permission, or a graph of one or more queries for one or more data object values, wherein the pin information is pinned to coordinates of the location in the one or more types of visualizations, and wherein the pin information is provided to one or more other visualizations that reference the at least one data object value associated with the pinned coordinates of the location; and instantiating a visualization engine to perform actions, including:
when a type of visualization is selected for display that employs one or more data object values that are associated with the one or more annotations, receiving the annotation metadata from the annotation engine;
when the annotation metadata affirms use of the one or more annotations associated with the one or more data object values that are employed by the selected type of visualization, including one or more annotation indicators in the selected visualization;
employing a user's selection of the annotation indicator at a location in the selected visualization to employ the pin information to identify one or more of a graph of a query, a widget, or a cell of spreadsheet to provide a display, at the associated level of granularity, of the one or more annotations associated with the one or more data object values, wherein the pin information is associated with the selected location in the selected visualization; and
employing geolocation information provided by a global positioning system (GPS) device to modify one or more features that are provided to improve understanding of the visualization and one or more of databases, user interfaces, internal processes, file systems, data models, or reports based on a location of a client computer employed by one or more users, wherein the one or more features include one or more of a time zone, a language, a financial currency, a calendar format, a local holiday, a local weather condition, or a culturally sensitive image.

2. The method of claim 1, further comprising:
instantiating a modeling engine to perform actions, including:
generating a data model based on a plurality of allocation rules and a plurality of data objects;
providing the data model and values of the plurality of data objects to the visualization engine for use in generating a visualization of the data model for display, wherein the visualization engine employs each annotation metadata associated with the plurality of data objects' values to determine whether to include one or more annotation indicators in the visualization.

3. The method of claim 1, wherein the annotation engine performs further actions, comprising:
receiving separate pin information for the one or more annotations; and
associating pin information with the annotation, wherein the pin information includes one or more of user roles, approved types of visualizations, time period for access to the annotation, user permissions, and level of granularity for access to associated data object values.

4. The method of claim 1, wherein the annotation engine performs further actions, comprising:
precomputing one or more queries for one or more data object values that are associated with the one or more annotations included with the displayed visualization.

5. The method of claim 1, wherein the visualization engine performs further actions, comprising:
employing one annotation indicator to reference a grouping of a plurality of annotations associated with data object values employed by the visualization.

6. The method of claim 1, wherein the annotation engine performs further actions, comprising:
providing filtering of one or more queries of one or more annotations that are associated with one or more annotation indicators included with the displayed visualization, wherein the filtering includes one or more of data object class, data object type, time stamp, annotation type, author, permission, role, visualization type, or annotation link.

7. The method of claim 1, wherein each annotation is persistently stored in an annotation table that includes one or more of a category, row, column, note (text of annotation), pin information or ID value.

8. The method of claim 1, wherein the selection of the type of visualization further includes one or more queries or graphs of queries for one or more data object values associated with the one or more annotations, and wherein the annotation metadata affirms use of the one or more annotations based on the one or more queries or graphs of queries.

9. A system for managing annotations over a network, comprising:
a server computer, comprising:
a memory for storing instructions;
one or more processors that execute the instructions to perform a method including:
instantiating an annotation engine to perform actions, including:
receiving associations of one or more annotations with one or more data object values, wherein an association and an annotation for each data object value is persistently stored as a data object for a data model together in a self-referential database, wherein a graph structure for the data model is represented in one table to reduce an amount of processing resources employed to perform one or more queries for the one or more data object values, and wherein the graph structure is a representation of a directed acyclic graph that includes each data object of the data model represented as a node and each allocation rule of the data model represented as an edge in the self-referential database;
receiving a query of an annotation table by a user;
in response to the query of the annotation table by the user, determining annotation metadata and an annotation identifier associated with each stored annotation, wherein the annotation metadata includes information including one or more types of visualizations that is approved for use with the annotation and the data object value that is associated with the annotation based on a graph of the query of the annotation, and wherein the annotation identifier is selectable by the user to cause display of the annotation with the one or more approved types of visualizations that were known and unknown prior to inclusion of the annotation in the annotation table; and
for one or more locations in the one or more types of visualizations, providing separate pin information that includes one or more of an association of a level of granularity for displaying at least one annotation above a first instance of its association with at least one data object value at a location in the one or more types of visualizations, a user role, an approved type of visualization, a time period for access to the at least one annotation when it is available for use with the one or more types of visualizations that is permitted to employ the at least one data object value associated with the at least one annotation, a user permission, or a graph of one or more queries for one or more data object values, wherein the pin information is pinned to coordinates of the location in the one or more types of visualizations, and wherein the pin information is provided to one or more other visualizations that reference the at least one data object value associated with the pinned coordinates of the location; and instantiating a visualization engine to perform actions, including:

when a type of visualization is selected for display that employs one or more data object values that are associated with the one or more annotations, receiving the annotation metadata from the annotation engine;

when the annotation metadata affirms use of the one or more annotations associated with the one or more data object values that are employed by the selected type of visualization, including one or more annotation indicators in the selected visualization; and employing a user's selection of the annotation indicator at a location in the selected visualization to employ the pin information to identify one or more of a graph of a query, a widget, or a cell of spreadsheet to provide a display, at the associated level of granularity, of the one or more annotations associated with the one or more data object values, wherein the pin information is associated with the selected location in the selected visualization; and a client computer, comprising:
  a memory for storing instructions;
  one or more processors that execute the instructions to perform a method including:
    employing geolocation information provided by a global positioning system (GPS) device to modify one or more features that are provided to improve understanding of the visualization and one or more of databases, user interfaces, internal processes, file systems, data models, or reports based on a location of the client computer employed by one or more users, wherein the one or more features include one or more of a time zone, a language, a financial currency, a calendar format, a local holiday, a local weather condition, or a culturally sensitive image;
    displaying the visualization to the user; and
    enabling the user to select the one or more annotation identifiers.

10. The system of claim 9, wherein the method further comprises:
  instantiating a modeling engine to perform actions, including:
    generating a data model based on a plurality of allocation rules and a plurality of data objects;
    providing the data model and values of the plurality of data objects to the visualization engine for use in generating a visualization of the data model for display, wherein the visualization engine employs each annotation metadata associated with the plurality of data objects' values to determine whether to include one or more annotation indicators in the visualization.

11. The system of claim 9, wherein the annotation engine performs further actions, comprising:
  receiving separate pin information for the one or more annotations; and
  associating pin information with the annotation, wherein the pin information includes one or more of user roles, approved types of visualizations, time period for access to the annotation, user permissions, and level of granularity for access to associated data object values.

12. The system of claim 9, wherein the annotation engine performs further actions, comprising:
  precomputing one or more queries for one or more data object values that are associated with the one or more annotations included with the displayed visualization.

13. The system of claim 9, wherein the visualization engine performs further actions, comprising:
  employing one annotation indicator to reference a grouping of a plurality of annotations associated with data object values employed by the visualization.

14. The system of claim 9, wherein the annotation engine performs further actions, comprising:
  providing filtering of one or more queries of one or more annotations that are associated with one or more annotation indicators included with the displayed visualization, wherein the filtering includes one or more of data object class, data object type, time stamp, annotation type, author, permission, role, visualization type, or annotation link.

15. The system of claim 9, wherein each annotation is persistently stored in an annotation table that includes one or more of a category, row, column, note (text of annotation), pin information or ID value.

16. The system of claim 9, wherein the selection of the type of visualization further includes one or more queries or graphs of queries for one or more data object values associated with the one or more annotations, and wherein the annotation metadata affirms use of the one or more annotations based on the one or more queries or graphs of queries.

17. A computer readable non-transitory storage media that include instructions for a method of managing annotations over a network, wherein execution of the instructions by one or more processors performs the method comprising:
  instantiating an annotation engine to perform actions, including:
    receiving associations of one or more annotations with one or more data object values, wherein an association and an annotation for each data object value is persistently stored as a data object for a data model together in a self-referential database, wherein a graph structure for the data model is represented in one table to reduce an amount of processing resources employed to perform one or more queries for the one or more data object values, and wherein the graph structure is a representation of a directed acyclic graph that includes each data object of the data model represented as a node and each allocation rule of the data model represented as an edge in the self-referential database;
    receiving a query of an annotation table by a user;
    in response to the query of the annotation table by the user, determining annotation metadata and an annotation identifier associated with each stored annotation, wherein the annotation metadata includes information including one or more types of visualizations that is approved for use with the annotation and the data object value that is associated with the annotation based on a graph of the query of the annotation, and wherein the annotation identifier is selectable by the user to cause display of the annotation with the one or more approved types of visualizations that were known and unknown prior to inclusion of the annotation in the annotation table; and for one or more locations in the one or more types of visualizations, providing separate pin information that includes one or more of an association of a level of granularity for displaying at least one annotation above a first instance of its association with at least one data object value at a location in the one or more types of visualizations, a user role, an approved type of visualization, a time period for access to the at least one annotation when it is available for use with the one or more types of visualizations that is permitted to employ the at least one data object value associated with the at least one annotation, a user permission, or a graph of one or more queries for one or more data object values, wherein the pin information is pinned to coordinates of the location in the one or more types of visualizations, and wherein the pin information is provided to one or more other visualizations that reference the at least one data object value associated with the pinned coordinates of the location; and instantiating a visualization engine to perform actions, including:

when a type of visualization is selected for display that employs one or more data object values that are associated with the one or more annotations, receiving the annotation metadata from the annotation engine;

when the annotation metadata affirms use of the one or more annotations associated with the one or more data object values that are employed by the selected type of visualization, including one or more annotation indicators in the selected visualization;

employing a user's selection of the annotation indicator at a location in the selected visualization to employ the pin information to identify one or more of a graph of a query, a widget, or a cell of spreadsheet to provide a display, at the associated level of granularity, of the one or more annotations associated with the one or more data object values, wherein the pin information is associated with the selected location in the selected visualization; and employing geolocation information provided by a global positioning system (GPS) device to modify one or more features that are provided to improve understanding of the visualization and one or more of databases, user interfaces, internal processes, file systems, data models, or reports based on a location of a client computer employed by one or more users, wherein the one or more features include one or more of a time zone, a language, a financial currency, a calendar format, a local holiday, a local weather condition, or a culturally sensitive image.

18. The media of claim 17, further comprising:
instantiating a modeling engine to perform actions, including:
generating a data model based on a plurality of allocation rules and a plurality of data objects;
providing the data model and values of the plurality of data objects to the visualization engine for use in generating a visualization of the data model for display, wherein the visualization engine employs each annotation metadata associated with the plurality of data objects' values to determine whether to include one or more annotation indicators in the visualization.

19. The media of claim 17, wherein the annotation engine performs further actions, comprising:
receiving separate pin information for the one or more annotations; and
associating pin information with the annotation, wherein the pin information includes one or more of user roles, approved types of visualizations, time period for access to the annotation, user permissions, and level of granularity for access to associated data object values.

20. The media of claim 17, wherein the annotation engine performs further actions, comprising:
precomputing one or more queries for one or more data object values that are associated with the one or more annotations included with the displayed visualization.

21. The media of claim 17, wherein the visualization engine performs further actions, comprising:
employing one annotation indicator to reference a grouping of a plurality of annotations associated with data object values employed by the visualization.

22. The media of claim 17, wherein the annotation engine performs further actions, comprising:
providing filtering of one or more queries of one or more annotations that are associated with one or more annotation indicators included with the displayed visualization, wherein the filtering includes one or more of data object class, data object type, time stamp, annotation type, author, permission, role, visualization type, or annotation link.

23. The media of claim 17, wherein each annotation is persistently stored in an annotation table that includes one or more of a category, row, column, note (text of annotation), pin information or ID value.

24. The media of claim 17, wherein the selection of the type of visualization further includes one or more queries or graphs of queries for one or more data object values associated with the one or more annotations, and wherein the annotation metadata affirms use of the one or more annotations based on the one or more queries or graphs of queries.

25. An apparatus for managing annotations over a network, comprising;
a memory for storing instructions:
one or more processors that execute the instructions to perform a method including:
instantiating an annotation engine to perform actions, including:
receiving associations of one or more annotations with one or more data object values, wherein an association and an annotation for each data object value is persistently stored as a data object for a data model together in a self-referential database, wherein a graph structure for the data model is represented in one table to reduce an amount of processing resources employed to perform one or more queries for the one or more data object values, and wherein the graph structure is a representation of a directed acyclic graph that includes each data object of the data model represented as a node and each allocation rule of the data model represented as an edge in the self-referential database;
receiving a query of an annotation table by a user;

in response to the query of the annotation table by the user, determining annotation metadata and an annotation identifier associated with each stored annotation, wherein the annotation metadata includes information including one or more types of visualizations that is approved for use with the annotation and the data object value that is associated with the annotation based on a graph of the query of the annotation, and wherein the annotation identifier is selectable by the user to cause display of the annotation with the one or more approved types of visualizations that were known and unknown prior to inclusion of the annotation in the annotation table; and for one or more locations in the one or more types of visualizations, providing separate pin information that includes one or more of an association of a level of granularity for displaying at least one annotation above a first instance of its association with at least one data object value at a location in the one or more types of visualizations, a user role, an approved type of visualization, a time period for access to the at least one annotation when it is available for use with the one or more types of visualizations that is permitted to employ the at least one data object value associated with the at least one annotation, a user permission, or a graph of one or more queries for one or more data object values, wherein the pin information is pinned to coordinates of the location in the one or more types of visualizations, and wherein the pin information is provided to one or more other visualizations that reference the at least one data object value associated with the pinned coordinates of the location; and instantiating a visualization engine to perform actions, including:

when a type of visualization is selected for display that employs one or more data object values that are associated with the one or more annotations, receiving the annotation metadata from the annotation engine;

when the annotation metadata affirms use of the one or more annotations associated with the one or more data object values that are employed by the selected type of visualization, including one or more annotation indicators in the selected visualization;

employing a user's selection of the annotation indicator at a location in the selected visualization to employ the pin information to identify one or more of a graph of a query, a widget, or a cell of spreadsheet to provide a display, at the associated level of granularity, of the one or more annotations associated with the one or more data object values, wherein the pin information is associated with the selected location in the selected visualization; and employing geolocation information provided by a global positioning system (GPS) device to modify one or more features that are provided to improve understanding of the visualization and one or more of databases, user interfaces, internal processes, file systems, data models, or reports based on a location of a client computer employed by one or more users, wherein the one or more features include one or more of a time zone, a language, a financial currency, a calendar format, a local holiday, a local weather condition, or a culturally sensitive image.

26. The apparatus of claim 25, wherein the method further comprises:

instantiating a modeling engine to perform actions, including:

generating a data model based on a plurality of allocation rules and a plurality of data objects;

providing the data model and values of the plurality of data objects to the visualization engine for use in generating a visualization of the data model for display, wherein the visualization engine employs each annotation metadata associated with the plurality of data objects' values to determine whether to include one or more annotation indicators in the visualization.

27. The apparatus of claim 25, wherein the annotation engine performs further actions, comprising:

receiving separate pin information for the one or more annotations; and associating pin information with the annotation, wherein the pin information includes one or more of user roles, approved types of visualizations, time period for access to the annotation, user permissions, and level of granularity for access to associated data object values.

28. The apparatus of claim 25, wherein the annotation engine performs further actions, comprising:

precomputing one or more queries for one or more data object values that are associated with the one or more annotations included with the displayed visualization.

29. The apparatus of claim 25, wherein the selection of the type of visualization further includes one or more queries or graphs of queries for one or more data object values associated with the one or more annotations, and wherein the annotation metadata affirms use of the one or more annotations based on the one or more queries or graphs of queries.

30. The apparatus of claim 25, wherein the annotation engine performs further actions, comprising:

providing filtering of one or more queries of one or more annotations that are associated with one or more annotation indicators included with the displayed visualization, wherein the filtering includes one or more of data object class, data object type, time stamp, annotation type, author, permission, role, visualization type, or annotation link.

* * * * *